INVENTOR.
CURTIS E. BRADLEY
BY
Herschel C. Omohundro
ATTORNEY

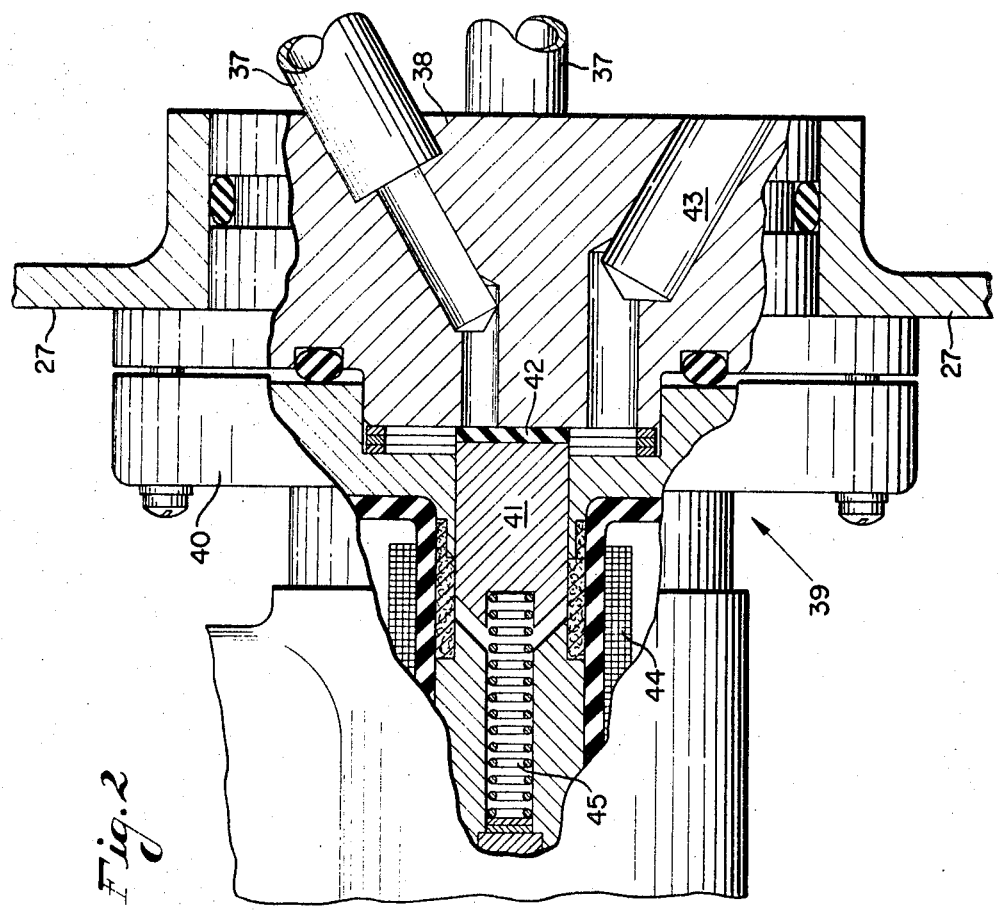

United States Patent Office 3,451,214
Patented June 24, 1969

3,451,214
COLD ENGINE START FACILITATING APPARATUS
Curtis E. Bradley, Phoenix, Ariz., assignor to The Garrett Corporation, Los Angeles, Calif., a corporation of California
Filed Mar. 15, 1967, Ser. No. 623,312
Int. Cl. F02c 7/26, 7/06; F16n 29/00
U.S. Cl. 60—39.14                                    8 Claims

ABSTRACT OF THE DISCLOSURE

Valve means is provided on an engine to connect the engine-driven lubricating pump inlet with a region provided with fluid at low viscosity, thus reducing the torque required to drive the pump during starting. When the engine starts, the valve immediately disconnects the pump inlet from the low viscosity fluid region.

Summary of the invention

Figure 1:
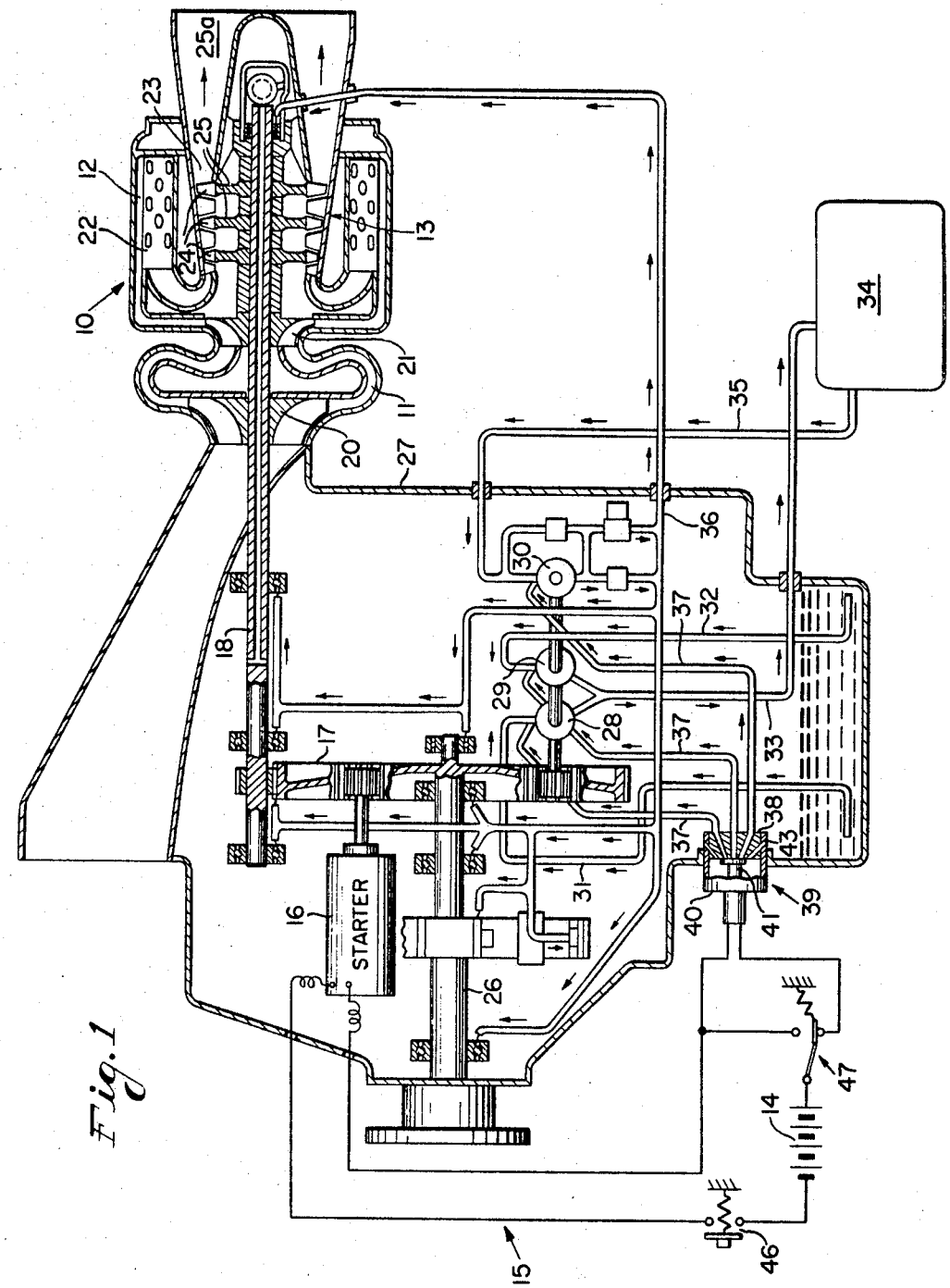

This invention pertains generally to prime movers such as gas turbine engines in the low-horsepower class which are conventionally started with battery power. In cold weather the battery capacity, which is determined by practical limits, may be insufficient to insure successful engine starting at all times and particularly in cold weather when oils or other lubricating mediums are thick. To improve engine starting capabilities the cranking torque requirements may be minimized by reducing the resistance imposed by the lubricating pump or pumps. This end is secured by connecting the inlet of the pump with the atmosphere or other region containing low-viscosity fluid so that the pump will not be required to operate under the load imposed by fluid of relatively high viscosity.

An object of this invention is to provide an engine with a valve which may be operated during the engine starting function to connect the lubricating or other pump inlet with a low viscosity fluid containing region, such as the interior of the engine or transmission casing above the oil level, this region being selected because it provides a protected source of clean air.

Another object is to provide a gas turbine or other type engine with a normally closed valve, the outlet of which is connected by tubing with the inlet of the lubricating or other fluid pump and the inlet of the valve being in communication with the interior of the engine or transmission casing. This arrangement provides a construction which will reduce the force required to drive the pump and at the same time be fail safe in that the valve will be biased toward a closed position by the flow of fluid to the pump.

A further object is to connect an electroresponsive valve in the circuit of the engine starting motor so that when the latter is energized the valve will be operated to connect the inlet of the lubricating or other fluid pump with a region containing fluid of low viscosity. When the starting motor is de-energized the valve will be closed, thus permitting the pump or pumps to operate normally and supply the bearings, gears and other relatively movable parts of the engine with lubricating fluid.

A still further object is to provide the starting motor circuit mentioned in the preceding paragraph with a thermostatic switch which will be operative to disconnect the electroresponsive valve from the circuit when the atmospheric temperature does not necessitate its use.

Other objects will be apparent from an inspection of the accompanying drawings and the following description of the form of invention illustrated.

The drawings

FIG. 1 is a schematic view showing a gas turbine engine with the cold engine start facilitating appartus incorporated therein; and FIG. 2 is an axial sectional view of a solenoid valve forming a part of the cold engine start facilitating apparatus shown in FIG. 1.

Description

Referring more particularly to the drawings, the gas turbine engine is designated generally by the numeral 10. This engine is schematically shown and comprises a two-stage compressor section 11, a gas combustion section 12 and a turbine section 13. The invention is applicable to engines of various types but is particularly suitable for low-horsepower gas turbine engines used in small aircraft wherein limited battery capacity is provided due to practical weight limits.

In such aircraft the gas turbine engines are started with an electric motor powered by the battery. In the illustration shown in FIG. 1, such battery is designated by the numeral 14. This battery is disposed in an electrical circuit 15 which includes an electric starting motor 16. This motor may be connected through motion transmitting gearing 17 with the shaft 18 of the gas turbine engine. The shaft 18 carries the impeller sections 20 and 21 of the compressor, the discharge from the second-stage compressor 21 flowing to the combustor section 12. This section contains a flame tube 22, the outlet of which communicates with an annular gas passage 23 into which the blades 24 of the turbine wheels 25 project. These wheels (in this instance constituting three in number) are also connected with the shaft 18 and transmit rotary movement to the shaft to drive the compressor impellers. Gases flowing from the turbine are exhausted through the outlet 25a. The shaft 18 is connected by the gearing 17 with a power output shaft 26 which may carry a propeller or other suitable power utilizing device. The gearing 17 is contained within a casing 27, the lower portion of which forms an oil reservoir.

In the operation of the gas turbine engine, oil is supplied under pressure to the various bearings and interengaging gear surfaces. To effect this lubrication a plurality of pumps 28, 29 and 30 are provided. These pumps are suitably driven by the gas turbine engine, such as by gears driven by the transmission 17. Pumps 28 and 29 are scavenging pumps which serve to draw oil through inlet pipes 31 and 32, respectively, from the reservoir and direct it through an outlet pipe 33 to an oil cooler 34. This cooled oil is drawn from the cooler through an inlet pipe 35 to the lubricating pump 30 and discharged into a lubricating network 36. Such network includes a plurality of ducts terminating in spray nozzles directed toward the bearings for the shaft elements and toward meshing surfaces of gears in the transmission 17.

It will be obvious that when the gas turbine engine operates, pumps 28, 29 and 30 will be driven to draw oil from the reservoir sections, pass this oil through the cooler 34, and supply it to the bearings of the gas turbine and transmission. When the temperatures are low the oil will become stiff and highly viscous, causing the pumps to require additional force to effect their operation. At this time an increased load will be paced on the battery 14. To avoid rapid depletion of the current supply, the invention herein has been provided. This invention consists in reducing the load caused by the pumps by connecting the inlets of the pumps with a source of fluid of relatively low viscosity. The fluid selected constitutes air which is relatively light when compared with the viscous oil.

In carrying out the invention, an inlet duct 37, or tube, is connected with each pump inlet and with a body 38 of a valve mechanism designated generally by the numeral 39. This valve mechanism is mounted on the casing 27 and the body 38 is provided on an inner surface with ports, each communicating with a duct 37. The surface around the ports provides valve seats. These seats are formed on a surface of the body 38 withing the housing 40 of the valve mechanism 39. The housing may be suitably secured to the casing 27 and forms a chamber for the movable reception of a valve plunger 41. A suitable sealing disc 42 is provided on the end of the plunger for sealing engagement with the surface containing the valve seats. When the plunger is so engaged, the seats will be closed and no air can flow to the ducts 37. When the plunger is disengaged from the element 38, air may flow from the interior of the reservoir through inlet ports 43 to the space surrounding the plunger and thence into the ports communicating with the ducts 37. It will be apparent that upon the admission of this air the pumps will no longer draw in oil and will be relieved of the load imposed by the cold, highly viscous oil.

An inspection of FIG. 2 will show that the plunger 41 constitutes an armature which is responsive to a field coil 44 disposed within the housing 40. A coil spring 45 is arranged between the inner end of the armature and a wall within the housing to resiliently urge the armature into a valve closing position. When the current is supplied to the coil 44, the armature will move in opposition to the force of the spring 45 away from a valve closing position. At this time, air will flow from the interior of the transmission casing through the ports 43 to the space within the valve housing surrounding the plunger 41 and into the inlet ducts 37 leading to the pumps 28, 29 and 30. The admission of air in this manner will reduce or eliminate the suction in lines 31, 32 and 35 leading to the pumps and prevent the entrance of cold oil. When current flow to coil 44 is interrupted, spring 45 will return plunger 41 to its valve closing position in which the flow of air from the casing to the pumps will be interrupted. It should be noted that the flow of air from the space surrounding plunger 41 to the ducts 37 will also tend to move the plunger toward a port closing position. If desired, the sizes of ducts 37 could be limited to restrict air flow sufficiently so as to insure some flow of oil to the pumps after the oil warms up in the event the plunger should stick in a valve open position.

One form of control for the valve 39 is a push-button switch 46 arranged in the circuit 15. This circuit may also be provided with a second switch 47 of the thermally operated, snap type, which when the atmosphere is cold will connect the valve mechanism 39 with the battery. At this time, the closing of the switch 46 to effect the opera tion of the starter motor will cause the valve 39 to open and connect the pump inlets with the source of fluid at low viscosity, in other words, the interior of the casing 27 above the oil level therein. Should the ambient temperature be above a predetermined level at which the viscosity of the oil is low, the thermostatic switch 47 will be in a position to bypass the valve 39 and the oil pumps will then operate normally.

I claim:

1. An apparatus for facilitating the starting operation of a cold engine comprising:
 (a) a fluid reservoir having a source of lubricating fluid and an air space above the level of said lubricating fluid,
 (b) at least one lubricating fluid pump connected for operation by the engine,
 (c) fluid passage means extending from said reservoir to said pump,
 (d) valve means communicating with said passage means, and
 (e) means for controlling said valve to selectively connect either the air space, or the lubricating fluid in said reservoir with said passage means whereby when said passage means communicates with said air space the torque required to operate the pump will be reduced.

2. The cold engine start facilitating apparatus of claim 1 in which said valve means is of the normally closed type.

3. The cold engine start facilitating apparatus of claim 1 in which said valve means is of the electro-magnetically operated type.

4. The cold engine start facilitating apparatus of claim 1 in which the passage means communicates with portions of a plurality of pumps driven by the engine and communication is simultaneously established by said valve means between all pumps and the space above the level of the lubricating fluid in the reservoir.

5. The cold engine start facilitating apparatus of claim 1 in which said passage means communicates with the inlet of the engine oil pump and said valve normally obstructs said passage, said valve communicating with the engine oil reservoir at a point above the oil level therein.

6. The cold engine start facilitating apparatus of claim 1 in which said valve means has a seat with a port communicating with said passage; a plunger normally resiliently engaged with said seat to close said passage; an electromagnetic means for selectively disengaging said plunger from said seat; and means forming at least one passage leading from the region around said plunger to the space above the level of the fluid in said lubricating fluid reservoir.

7. The cold engine start facilitating apparatus of Claim 1 in which said engine is provided with an electric starting motor, said valve means is of the electromagneically operated type, and a control switch means for said valve means is connected in circuit with said electric starting motor and energized when the starting motor is energized and de-energized when current flow to the starting motor is interrupted.

8. The cold engine start facilitating apparatus of claim 1 in which said valve means is electrically operated and is connected in an electric circuit; and a thermo-responsive control is arranged in said circuit to render said valve means inoperative at a predetermined temperature.

References Cited

UNITED STATES PATENTS

| 1,977,877 | 10/1934 | Handy. |
| 2,401,910 | 6/1946 | Condit. |
| 2,711,071 | 6/1955 | Frankel. |
| 2,751,749 | 6/1956 | Newcomb _____ 60—39.14 XR |
| 3,321,910 | 5/1967 | Davies et al. _____ 60—39.08 |

CARLTON R. CROYLE, *Primary Examiner.*

U.S. Cl. X.R.

60—39.8; 103—6, 203; 123—179; 184—6; 230—24 024